United States Patent
Hamada et al.

(10) Patent No.: US 6,899,429 B2
(45) Date of Patent: May 31, 2005

(54) OPTICAL PROCESS UNIT, IMAGE GENERATION SYSTEM USING THE SAME AND OPTICAL PROCESS METHOD OF THE SAME

(75) Inventors: Koichi Hamada, Tokyo (JP); Masaru Kanazawa, Tokyo (JP); Fumio Okano, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 10/759,251

(22) Filed: Jan. 20, 2004

(65) Prior Publication Data

US 2004/0145705 A1 Jul. 29, 2004

(30) Foreign Application Priority Data

Jan. 24, 2003 (JP) ........................................ 2003-015478

(51) Int. Cl.[7] ............................................... G03B 21/14
(52) U.S. Cl. ............................ 353/20; 353/8; 359/464; 359/634
(58) Field of Search ......................... 353/7, 8, 20, 31, 353/33, 34, 37; 349/5, 7, 8, 9, 15; 359/464, 465, 634

(56) References Cited

U.S. PATENT DOCUMENTS 5,864,374 A * 1/1999 Ito et al. ...................... 348/757
6,309,071 B1 * 10/2001 Huang et al. .................. 353/31
6,631,993 B2 * 10/2003 Fielding ........................ 353/31
2004/0012761 A1 * 1/2004 Haino et al. ................... 353/31

OTHER PUBLICATIONS

K. Hamada et al.; "A wide–screen projector of 4k x 8k pixels"; 46.3/*Hamada*; 4 pages.

* cited by examiner

*Primary Examiner*—William C. Dowling
(74) *Attorney, Agent, or Firm*—Armstrong, Kratz, Quintos, Hanson & Brooks, LLP

(57) ABSTRACT

An optical processing unit comprises a dichroic filter to filtrate a green-colored light off a white light, a polarizer to selects a certain linearly polarized light component from the filtrated green-color light and a dichroic mirror to resolve the light into two lights as the first light beam and the second light beam divided at a predetermined wave length, two beam splitters to change the propagation direction of the light beams, liquid crystal devices to reflect the light beams thereon, reflective image superimposing devices to superimpose image information in the reflection onto two image lights and a dichroic mirror to compose these two image lights into an identically single image light which directs toward a direction in a single optical axis. This invention can provide an optical process unit that realizes a high fidelity stereo image display system wherein the pixel-shifted image generation and the stereo image display are compatible.

6 Claims, 7 Drawing Sheets

OPTICAL PROCESS UNIT, IMAGE GENERATION SYSTEM USING THE SAME AND OPTICAL PROCESS METHOD OF THE SAME

FIELD OF THE INVENTION

The present invention relates to an optical process unit for image display apparatus further specifically to an optical process unit of a high definition image generation device that can be used for a stereoscopic image display and a method of optical process realizing the high definition stereoscopic image display.

BACKGROUND OF INVENTION

As a conventional technology to realize a high definition stereo image display, a green-color pixel shifting method as described in the following paragraph has been proposed. As for a stereoscopic viewing technology, polarizing glasses are well-known for a polarized dual-view stereo display to realize such stereo image display.

Figure 6:
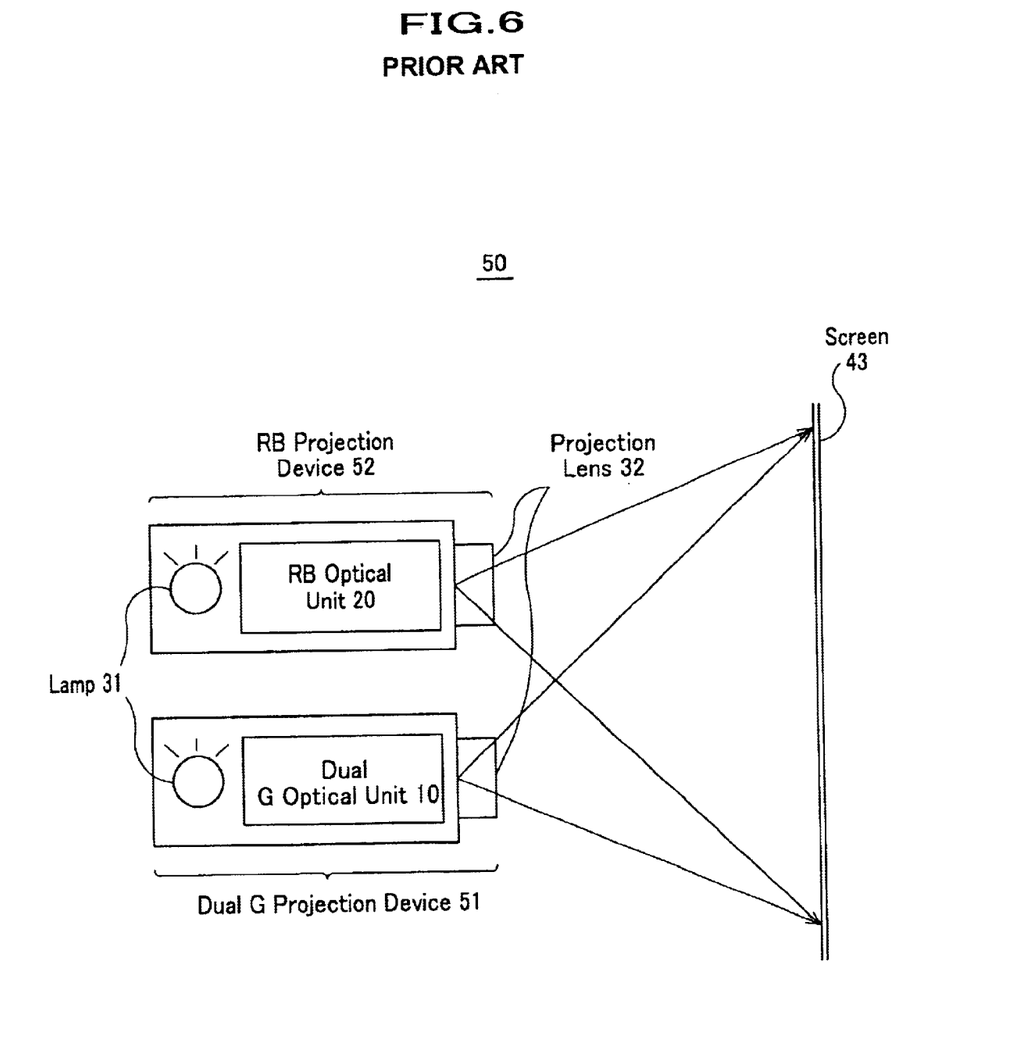
FIG. 6 is a schematic that shows the conventional high fidelity image generation system.

To begin with, a conventional display apparatus using the green-color pixel shifting method will be explained by using the FIG. 6. FIG. 6 shows a schematic that shows a display system 50 based on the technology used for the conventional display apparatus. The display system comprises an RB projection device 52, a dual G projection device 51 and a screen 43, where RB and G stand for red-color and blue-color lights and green-color light, respectively.

The RB projection device 52 is a projection device that comprises a lamp 31, a project lens 32 and an RB optical unit that projects R image and B image to a screen 43.

The dual G projection device 51 comprises lamps 31, projection lenses 32 and a dual G optical process unit 10 that projects a dual G image consisting of a G image and a pixel-shifted G image onto a screen 43.

The R image, G image (and the pixel-shifted G image) and B image respectively correspond to images of red-color, green-color and blue-color which are segregated for three primary colors by three display devices (or color panels)

Figure 7:
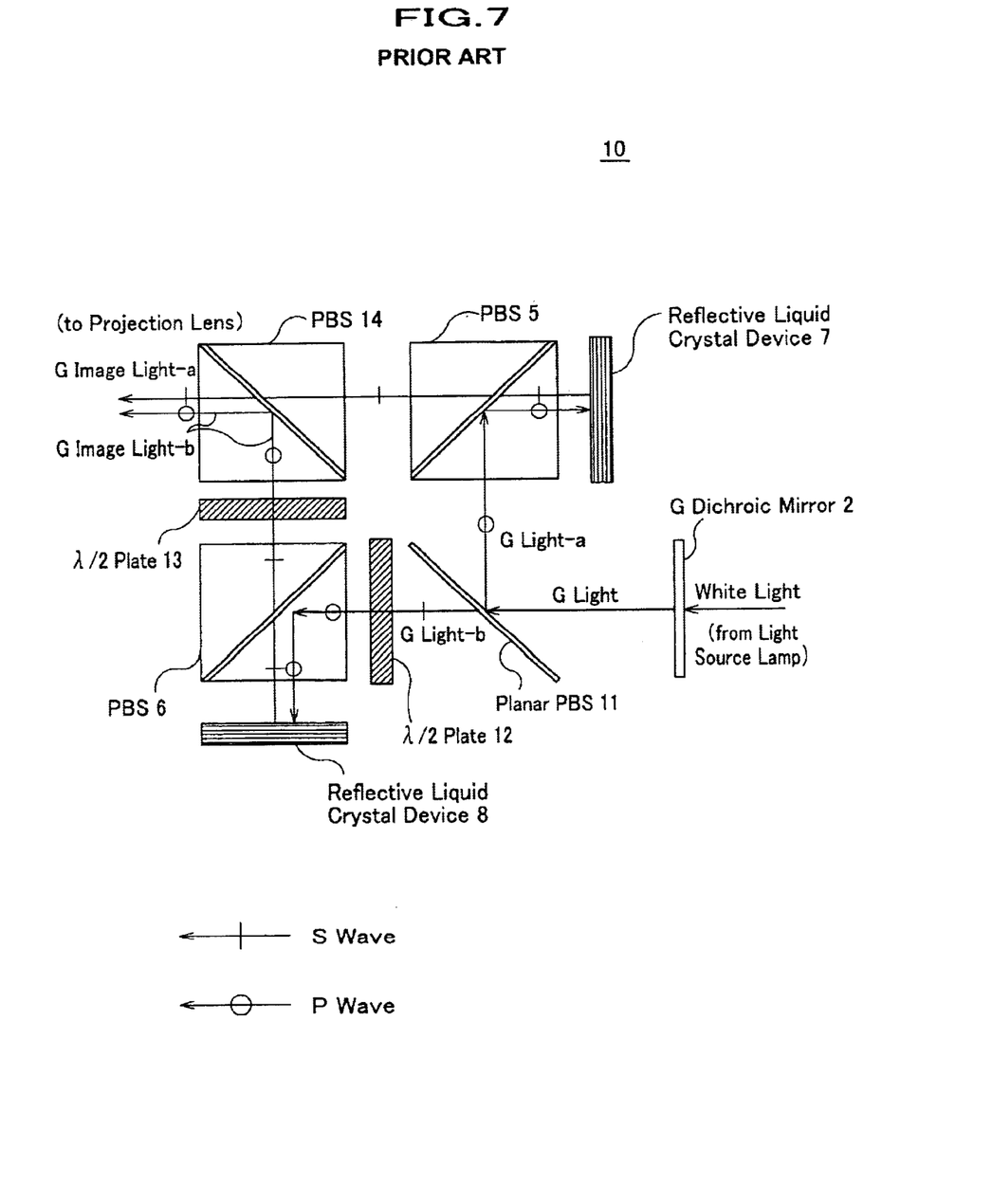
FIG. 7 is a block diagram that shows the conventional dual G optical unit.

The dual G optical process unit 10 will be explained by using the FIGS. 2, 6 and 7. FIG. 7 is a block diagram that shows a composition of a conventional dual G optical process unit 10. The conventional dual G optical process unit comprises a light source lamp 31 (shown in FIG. 6), G dichroic mirror 2 that filtrates the green-color light off a white light emitted by the light source lamp 31 penetrating therethrough, a polarizing beam splitter PBS 11 that segregates G light into two polarized beams as S wave and P wave as called G light-a and G light-b which are orthogonal to each other, PBS 5 and PBS 6 that reflect G light-a and G light-b into reflective liquid crystal devices 7 and 8, respectively, as well as the G light-a and G light-b traveling through the PBS 5 and PBS 6, two half-wave plates 12 and 13 being set in the path of G light-b, a polarized beam splitter PBS 14 that leads polarized two beams of G image lights (as G image light-a and G image light-b) into a projection lens 32. The polarized beam splitter as abbreviated as "PBS" allows the light being normally and parallely polarized against the surface of PBS to travel through and reflect upon the PBS, respectively. The dichroic mirror allows to filtrate only the light that has a predetermined wave length to transmit therethrough.

The operation of this optical process unit is explained. A G light passes through G dichroic mirror 2 once a white light emitted from the light source lamp 31 is input thereto. The G light which is isotropically polarized is input to the PBS plate as PBS 11 and the P wave is reflected as G light-a and S wave is transmitted as G light-b. The behaviors of both G light-a and G light-b are explained as bellows.

(G Light-a)

The G light-a (P wave) that is reflected at the PBS plate PBS 11 is incident onto PBS 5 is reflected to a reflective liquid crystal device 7. The G light-a is reflected under the condition that the polarization is rotated 90 degrees at the reflective liquid crystal device 7. The polarized reflected G light-a works as an image light called as a G image light-a of which polarization is S wave. The G image light-a can travel through the PBS 5 and is incident to PBS 14 but transmits PBS 14 due to the polarization as S wave. Finally the G image light-a goes to a projection lens 32.

(G Light-b)

The G light-b (S wave) that transmits through PBS plate PBS 11 is incident onto a half-wave plate 12 and the polarization of G light-b is rotated. Then the G light-b (now P wave) that is incident to PBS 6 is reflected to a reflective liquid crystal device 8. The G light-b is reflected under the condition that the polarization is rotated 90 degrees in the reflection at the reflective liquid crystal device 8. The polarized reflected G light-b works as an image light called as a G image light-b of which polarization is S wave. The G image light-b passes through another half-wave plate 13 where the polarization is rotated in another 90 degrees and is incident to PBS 14 as P wave. Then the G light-b is reflected at PBS14 and finally goes to a projection lens 32.

In this system, a G image light and a pixel-shifted G image light are made from the G image light-a (S wave) and G image light-b (P wave), respectively. These two G image lights are projected onto the screen 43 with R image light (S wave) and B image light (S wave) which are projected by RB projection device 52. Then a high definition image display can be obtained.

As for the green-color pixel-shifted high definition image display has been proposed by a paper "A wide-screen projection of 4 k×8 k pixels" (Ref. 1).

A polarized dual-view stereo display is to realize such a stereo image display by the observer who uses polarized glasses that he or she sees two images by the right and left eyes where the two images have different polarizations provided by two display devices.

Reference:

Ref. 1; K. Hamada, M. Kanazawa, I. Kondoh, F. Okano, Y. Haino, M. Sato and K. Doi, "A wide-screen projector of 4 k×8 k pixels", No. 46.3, Symposium of SID (Society for Information Display) (2002).

In the conventional green color light pixel-shifted image display device, the normal image and the pixel-shifted image have different polarization (mutually orthogonal to the other) each other as P wave and S wave and are projected to the screen. In this polarization scheme, the polarization glasses to filtrate an image to the right-eye sight and left-eye sight that allows a stereo image viewing may pass either P wave or S wave of the pixel-shifted image or P wave rich or S wave rich image (of the pixel-shifted image) depending on the compliance to the alignment of the polarization of the polarizing glasses. Therefore, the composition of the total pixel-shifted image which is a mixture of the normal polarization image and orthogonal polarization image, each having the normal image component and the pixel-shifted image component, looses the balance between two image components upon the polarization of the polarizing glasses. In the projectors to project the image onto the screen of which image is viewed by the polarization glasses to produce stereo viewing image, the difference of the polarization may works as to select P wave or S wave, therefore the total pixel-shifted image looses the balance between the normal image component and the pixel-shifted image in the optical process for such projection. In other words, it is not possible to keep the compatibility between the G pixel-shifted image processing technology and the polarized stereo image processing technology since both processing uses the polarization technology.

BRIEF SUMMARY OF INVENTION

In the conventional technology, a polarization beam splitter makes two G lights necessary for generating the normal image component and the pixel-shifted image component in segregation and the composition into a singe beam is done by using the difference of the polarization. The present invention does not use such difference of the polarization but the slight difference of the wave length selectivity for the segregation and the composition. For this purpose, dichroic mirrors alter the polarizing beam splitters which have been used in the conventional technology. The present invention can be advantageous to generate the normal image components and the pixel-shifted image component in a single polarization, and therefore such optical process can be directly applied to the image sources for the polarized dual-view stereo displays for the purpose of such stereo image displays. In a further advantage, the present invention can provide an optical process unit that serves for the display system featuring high fidelity stereo image display and the system thereof, wherein the high fidelity capability is realized with the pixel-shifted image for G light.

DETAILED DESCRIPTION OF THE INVENTION

The fundamental construction of the present invention is formed as follows. The optical process unit comprises a filtering means that selects G light, a polarizing means that selects a certain polarized light component, a resolution means that resolves the G light into the first light beam and the second light beam, the first and the second orientating means that change direction of the first second light beams, the first and the second image information superimposing means that superimpose image information thereon, an image light composing means that composes the first image light and the second image lights into a single image light. These optical elements work for the principal optical behaviors to realize the present invention.

In the optical process unit constructed as described above for the present invention, the filtering means discriminates a colored light which has a predetermined wavelength range from a white light and filtrates it off the white light at the first stage. Then the polarizing means selects a certain polarized light component from the colored light so that the light component is compliant to the linearly polarizing direction of the polarizing means and lets such linearly polarized light to pass therethrough. The linearly polarized colored-light is divided into two kinds of light by using a wave length resolution means so that the linearly polarized colored-light is resolved at a certain wave length to the first light beam and the second light beam. The first orientating means changes the direction of the first light beam to the first reflective display device and lets the output light, that is a reflected light of the first light beam at the first reflective display device, pass therethrough. The second orientating means changes the direction of the second light beam to the second reflective display device and lets the output light, that is a reflected light of the second light beam at the first reflective display device, pass therethrough. The first passing light from the first orientating means and the second passing light from the second orientating means have image information at the reflections by means of the first and the second reflective display devices and are called the first and the second image lights, respectively. At the final stage of the optical process unit, the image light composing means composes the first and second image lights into a single image light propagating to a projection lens. The composition is realized in a manner such that the first image light straightly passes the two-light composing means and the second image light is changed of the propagation direction therein, or vice versa. All of the above optical components that function the above means are aligned in a way such that the first and the second image lights are collimated to be composed into a single image light in the final stage.

The detail functions of the optical elements constructing this optical process unit are explained. Assuming the linearly polarized light to be processed in this optical process unit has only a polarization of P wave and has a predetermined wave length $\lambda 3$ in the range over $\lambda 1$ to $\lambda 2$ wherein a wave length $\lambda 3$ is in a spectrum range of wave length between $\lambda 1$ and $\lambda 2$, the optical process unit filtrates the white light into a predetermined wave length light and selects P wave by the polarization means. Therefore the selected light has a color spectrum in the predetermined wave length $\lambda 3$ and P wave liner polarization. This light is then resolved into two light beams by a wave length resolution means such that the first light beam has the wave length as $\lambda < \lambda 3$ and the second light beam as $\lambda < \lambda 3$. The first and the second orientating means set the direction of the propagation of the first and the second light beams to the first and the second reflective display devices, respectively. The first image light ($\lambda < \lambda 3$; P wave) and the second image light ($\lambda > \lambda 3$; P wave) after reflecting at the first and the second reflective display devices propagate to the image light composing means that composes the first image light ($\lambda < \lambda 3$; S wave) and the second image light ($\lambda > \lambda 3$; S wave) into an identically single image light which directs toward a direction in a single optical axis. Both the first and the second lights reflected at reflective display devices rotate the polarization in 90 degree and the P wave polarization turns into S wave. Therefore the two image lights are S waves. The optical process unit process the white light into two image lights as ($\lambda<\lambda 3$; S wave and $\lambda>\lambda 3$; S wave).

Further advantage of the optical process unit in the present invention is provided in the following construction. The optical process unit has a filtering means that filtrates the G light off a white light. The polarizing means selects a certain polarized G light component from the G light so that the light component is compliant to the linearly polarizing direction of the polarizing means and lets such linearly polarized G light pass therethrough. The linearly polarized G light is divided into two kinds of G light by using a wave length resolution means so that the linearly polarized G light is resolved at a certain wave length to the first G light beam and the second G light beam. These two G light beams propagate to the first and the second orientating means which set the direction of the propagation of the first and the second G light beams to the first and the second reflective display devices, respectively. Both the first and the second G light beams reflected at reflective display devices turn into the first image G light and the second image G light and propagate to the image light composing means that composes the first image G light and the second image G light into an identically single image G light which directs toward a direction in a single optical axis.

All of the optical components that construct the optical process unit of the present invention are properly aligned so that the first image G light and the second image G light are composed into an identically single image G light that travels toward the projection lens.

The advantage of the optical process unit in the present invention provides further invention explained in the following construction. An image generation device is constructed with an optical process unit in the present invention and the other image generation device is constructed with another optical process unit with a polarizer which rotates the polarization of the image light emitted by the optical process unit. The former image generation device is constructed with an optical process unit that emits G light (called G image generation device for the right eye) and the latter image generation device is constructed with an optical process unit that emits G light (called G image generation device for the left eye). The former image generation device is constructed with an optical process unit that emits R and B lights (called RB image generation device for the right eye) and the latter image generation device is constructed with an optical process unit that emits RB light (called RB image generation device for the left eye). Further invention is implemented by the image generation system that is composed of these four image generation devices. The image generation devices for the right eye (wherein no polarizers are used) and for the left eye (wherein polarizers are used) can be alternated for right eye versus left eye.

According to the above construction of the image generation devices, the G image generation devices project image G lights, which include two ranges of the different wave lengths, to a screen. The RB image generation devices project image RB lights to the screen. By this system construction, a high fidelity image can be projected onto the screen. The image generation devices assigned for the right eye and the left eye project lights, which are mutually orthogonal, to the screen.

The optical process unit with regard to the present invention functions for the image generation in a method that processes the light used for the application thereof. The optical light process in the present invention is explained as follows.

The optical process unit has a filtering step to filtrate a color light having a predetermined wave length off a white light, a polarizing step to selects a certain linearly polarized light component from the filtrated color light, a wave length resolving step to resolve the linearly polarized light into two light beams as the first light beam and the second light beam divided at a certain wave length. Further more, the optical process unit has an orientating step so that the propagation directions are changed as the first and the second light beams propagates towards the first and the second reflective display devices, respectively. At image information superimposing step, the first and the second light beams turn into the first and the second image lights after being reflected on the first and the second reflective display devices, respectively, where image information is superimposed to the light beams. As a final step, the optical process unit has an image light composing step so that the first and second image lights are composed into an identically single image light which directs toward a direction in a single optical axis.

The details of embodiments regarding the present invention are explained using the drawings.

First Embodiment

Figure 1:
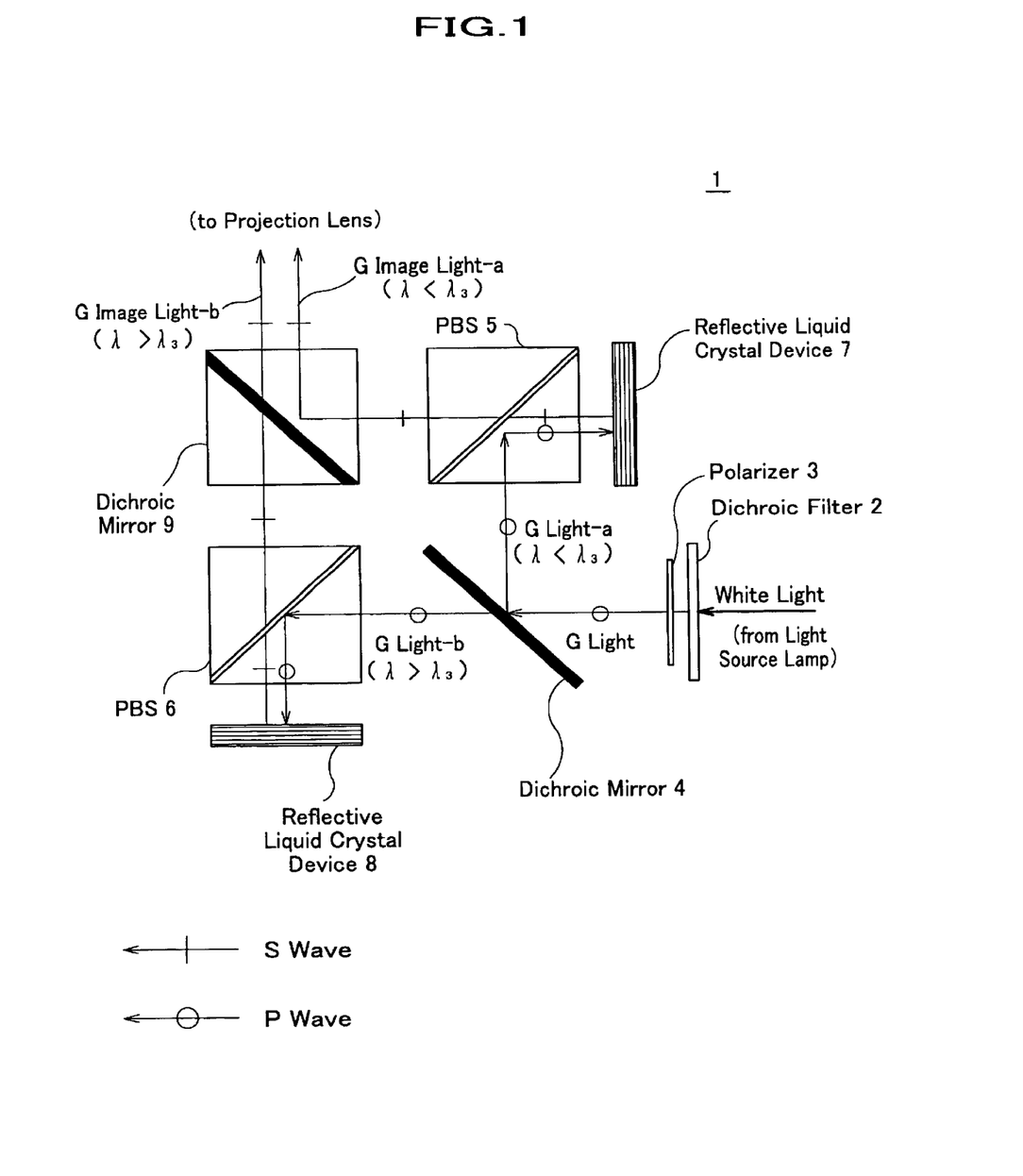
FIG. 1 is a block diagram that shows the construction of the optical process unit according to the first embodiment of the present invention.
Figure 2:
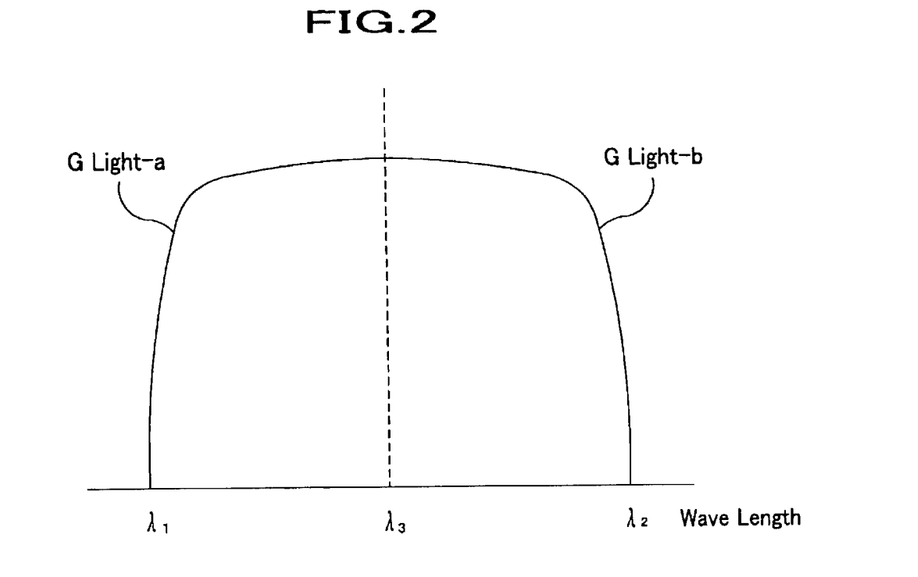
FIG. 2 is a drawing that shows the spectrum of the green light in a range of wave length $\lambda 1$ to $\lambda 2$ at the center wavelength of $\lambda 3$.
Figure 3:
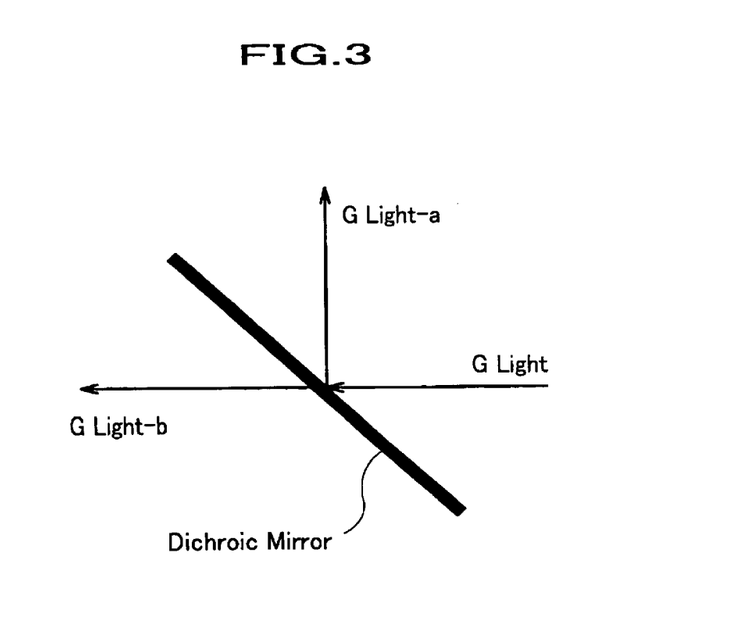
FIG. 3 shows optical behavior of the green light at the dichroic mirror as traveling through and reflecting upon.

The optical process unit 1 in the first embodiment is explained using the FIGS. 1 to 3. FIG. 1 is a block diagram that shows the construction of the optical process unit according to the present invention. FIG. 2 shows an explanatory schematic of the spectrum of the green-color light, where the green-color light has a range of the wave length from $\lambda 1$ at the lower limit to $\lambda 2$ at the upper limit with $\lambda 3$ at the central wave length. FIG. 3 schematically shows G light can be divided into a reflected G light and a transmitting G light by a dichroic mirror, provided the incident light is polarized in parallel to the surface of the dichroic mirror. The dichroic mirror reflects a light that has a certain range of the wave length and passes another light that has another range of wave length.

The optical process unit as shown in FIG. 1 comprises a G dichroic filter 2 (a filtering means), a polarizer 3 (a linear polarizing means) that selects G light of which polarization direction is compliant to the direction of the polarizer, a dichroic mirror 4 (called as wave length resolution means) that resolves the linearly polarized G light into two light beams as the first light beam (called as G light-a) and the second light beam (called as G light-b) divided at a predetermined wave length, two polarizing beam splitter as PBS 5 and PBS 6 that respectively change the propagation direction of the G light-a and G light-b towards reflective liquid crystal devices 7 and 8 (called as the first and the second liquid crystal display devices, respectively), reflective liquid crystal devices 7 and 8 that superimpose image information to the first and second light beams in the reflection at the reflective display devices 7 and 8 so that the first and second light beams respectively turn into the first and second image lights and a dichroic mirror 9 (called as an image light composing means) that composes the first and second image lights into an identically single image light which directs toward a direction in a single optical axis.

The dichroic filter 2 is a filtrating device that passes the light, being in the range of the wave lengths between $\lambda 1$ and $\lambda 2$, but does not pass the other light. The polarizer 3 filtrates P wave component off the G light passing through the dichroic filter 2.

The dichroic mirror 4 reflects G light-a ($\lambda<\lambda 3$; P wave) and passes G light-b ($\lambda>\lambda 3$; P wave) of the G light which is in the range between $\lambda 1$ and $\lambda 3$ with the central wave length at $\lambda 3$. Strictly speaking, G light-a and G light-b have different wave lengths and therefore the color of the light is slightly different from each other. However for visual perceiving for human eyes cannot distinguish each of the lights when the lights are presented with other color lights which is a typical case for the optical image generation. Therefore the G light-a and G light-b are both perceived as G lights.

PBS 5 changes the direction of G light-a in the reflection towards the reflective liquid crystal 7 as well as pass G image light-a, being reflected at the reflective liquid crystal 7, through. PBS 6 changes the direction of G light-b in the reflection towards the reflective liquid crystal 8 as well as passes G image light-b, being reflected at the reflective liquid crystal 8, through.

The reflective liquid crystal 7 rotates the polarization of G light-a in 90 degrees and turns it G image light-a ($\lambda<\lambda 3$, S wave) after imposing the image information upon the reflection at the reflective liquid crystal 7. The reflective liquid crystal 8 rotates the polarization of G light-b in 90 degrees and turns it G image light-b ($\lambda>\lambda 3$, S wave) after imposing the image information upon the reflection at the reflective liquid crystal 8.

The dichroic mirror 9 reflects G image light-a ($\lambda<\lambda 3$, S wave) and passes G image light-b ($\lambda>\lambda 3$, S wave). In the present alignment of the dichroic mirror 9, G image light-a ($\lambda<\lambda 3$, S wave) that propagates from the reflective liquid crystal is folded in 90 degrees thereat. The dichroic mirror 9 passes G image light-b ($\lambda>\lambda 3$, S wave). As the result, G image light-a and G light-b are composed into an identically single image light which directs toward a direction in a single optical axis, for which the alignment of all these optical components is properly arranged.

The optical process unit 1 as described above filtrates G light that has the wave length range between $\lambda 1$ and $\lambda 2$ off the white light emitted from a light source and passes the G light by using a G dichroic filter and selects P wave component from the G light propagating from the dichroic filter 2 by using a polarizer 3. The optical process unit 1 resolves G light (P wave) into G light-a ($\lambda<\lambda 3$, P wave) and G light-b ($\lambda>3$, P wave) by using the dichroic mirror 4 and orients these lights to PBS 5 and PBS 6 that orient the lights to the reflective liquid display 7 and 8 as well. The optical process unit 1 superimposes the image information to the G light-a and G light-b as propagating as explained above by using the reflective liquid display 7 and 8. Then G light-a and G light-b turn into G image light-a ($\lambda<\lambda 3$, S wave)and G image light-b ($\lambda>\lambda 3$, S wave) the optical process unit 1 composes a single image light from G image light-a and G image light-b by using a dichroic mirror 9, wherein the single image light has a single optical axis.

Figure 8:
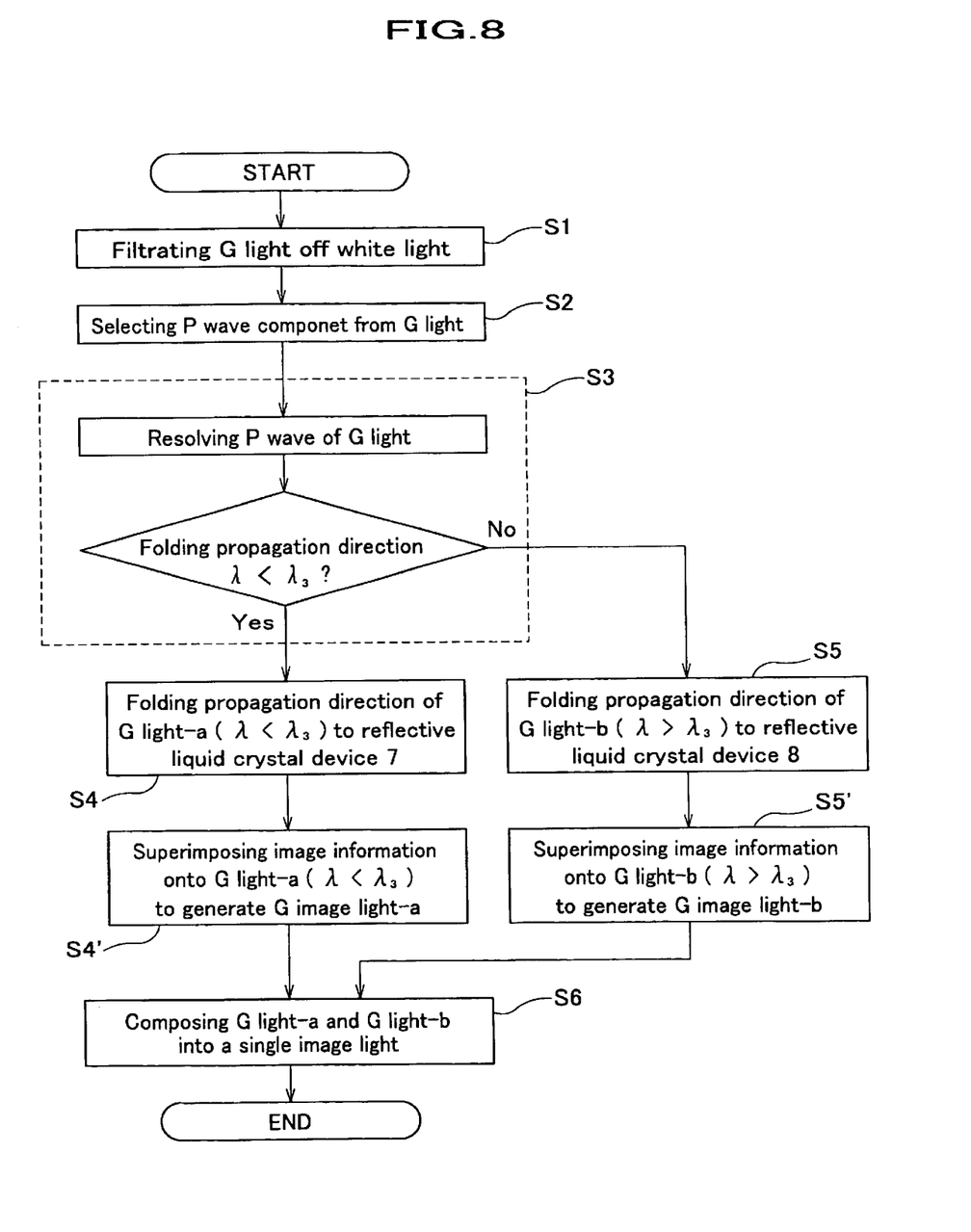
FIG. 8 is a flow chart that shows the process done in the optical process unit according to the first embodiment of the present invention.

The step of optical process carried out by the optical unit 1 is explained using FIG. 1 to FIG. 8. FIG. 8 is a flow chart that shows the optical process of the optical process unit 1.
(Filtering Step)

The G dichroic filter 2 filtrates G light which has a wave length in the range between $\lambda 1$ and $\lambda 2$ off a white light emitted from a light source and incident thereto and passes the filtrated G light (Step S1). The "G light which has a wave length in the range between $\lambda 1$ and $\lambda 2$" corresponds to "a colored light which has a predetermined wave length range" against the white light.
(Polarizing Step)

The G light passing through G dichroic filter 2 incidents to the polarizer 3 that selects P wave which has a certain linearly polarized light component and the G dichroic filter 2 passes only such P wave (Step S2). The description as "passes only P wave" corresponds to "selectively passes the light that has a predetermined linearly polarized light component".

(Wave Length Resolving Step)

The G light of which component is a P wave being selected by the polarizer 3 incidents to a dichroic mirror 4 which has a resolving function with respect to the wave length such that the dichroic mirror 4 passes G light-b ($\lambda>\lambda 3$; P wave) which has a wave length longer than $\lambda 3$ toward PBS 6 and folds the propagation direction of the G light-a ($\lambda<\lambda 3$; P wave) which has a wave length shorter than $\lambda 3$ toward PBS 5 by the reflection (Step S3).

The wave length $\lambda 3$ is the central wave length in the range between $\lambda 1$ and $\lambda 2$. The wave length of "$\lambda 3$" corresponds to "predetermined wave length" for the predetermined wave length range. When the wave length $\lambda$ of the G light equals to $\lambda 3$ (such as $\lambda=\lambda 3$), the G light passes or transmits the dichroic mirror 4.
(In Case of G light-a Processing)
(Orientating Step)

The G light-a ($\lambda<\lambda 3$; P wave) incidents to PBS 5 after being reflected at dichroic mirror 4 wherein PBS 5 folds the propagation direction of the G light-a in 90 degrees and G light-a propagates to the reflective liquid crystal 7 (Step S4).
(Image Information Superimposing Step)

The reflective liquid crystal 7 rotates the polarization of the G light-a in 90 degrees (so that the P wave is converted into the S wave) as well as superimposes the image information onto the reflected G light-a called as G image light-a. The G image light-a can pass through PBS 5 since the polarization is orthogonal to the beam splitting surface of PBS 5 and therefore propagates to the next step (Step 4').
(Image Light Composing Step)

The dichroic mirror 9 reflects the G image light-a in 90 degree angle to a projection lens which is not shown in the figures. More concretely, the reflected G image light-a is aligned in a certain optical axis to be composed with G image light-b, being processed in the other optical process line after S3, into an identically single image light which directs toward a direction in such a single optical axis (Step S6).
(In Case of G light-b Processing)
(Orientating Step)

The G light-b ($\lambda>\lambda 3$; P wave) incidents to PBS 6 after being reflected at dichroic mirror 4 wherein PBS 5 folds the propagation direction of the G light-b in 90 degrees and G light-b propagates to the reflective liquid crystal 8 (Step S5).
(Image Information Superimposing Step)

The reflective liquid crystal 8 rotates the polarization of the G light-b in 90 degrees (so that the P wave is converted into the S wave) as well as superimposes the image information onto the reflected G light-b called as G image light-b. The G image light-b can pass through PBS 6 since the polarization is orthogonal to the beam splitting surface of PBS 6 and therefore propagates to the next step (Step 5').
(Image Light Composing Step)

The dichroic mirror 9 passes the G image light-b therethrough to a projection lens which is not shown in the figures. More concretely, the reflected G image light-b is aligned in a certain optical axis to be composed with G image light-a, being processed in the other optical process line after S3, into an identically single image light which directs toward a direction in such a single optical axis (Step S6).

The present invention is not limited to be applied to the embodiment as explained above but other applications. The present invention is applied to the optical processing unit used for the pixel-shifted G image generation in the above embodiment. However the other color light image (such as G image generation and B image generation) can be generated by changing the spectrum characteristics of a combination of a dichroic filter and dichroic mirrors. The design of the color can be carries out by such characterization.

Second Embodiment

Figure 5:
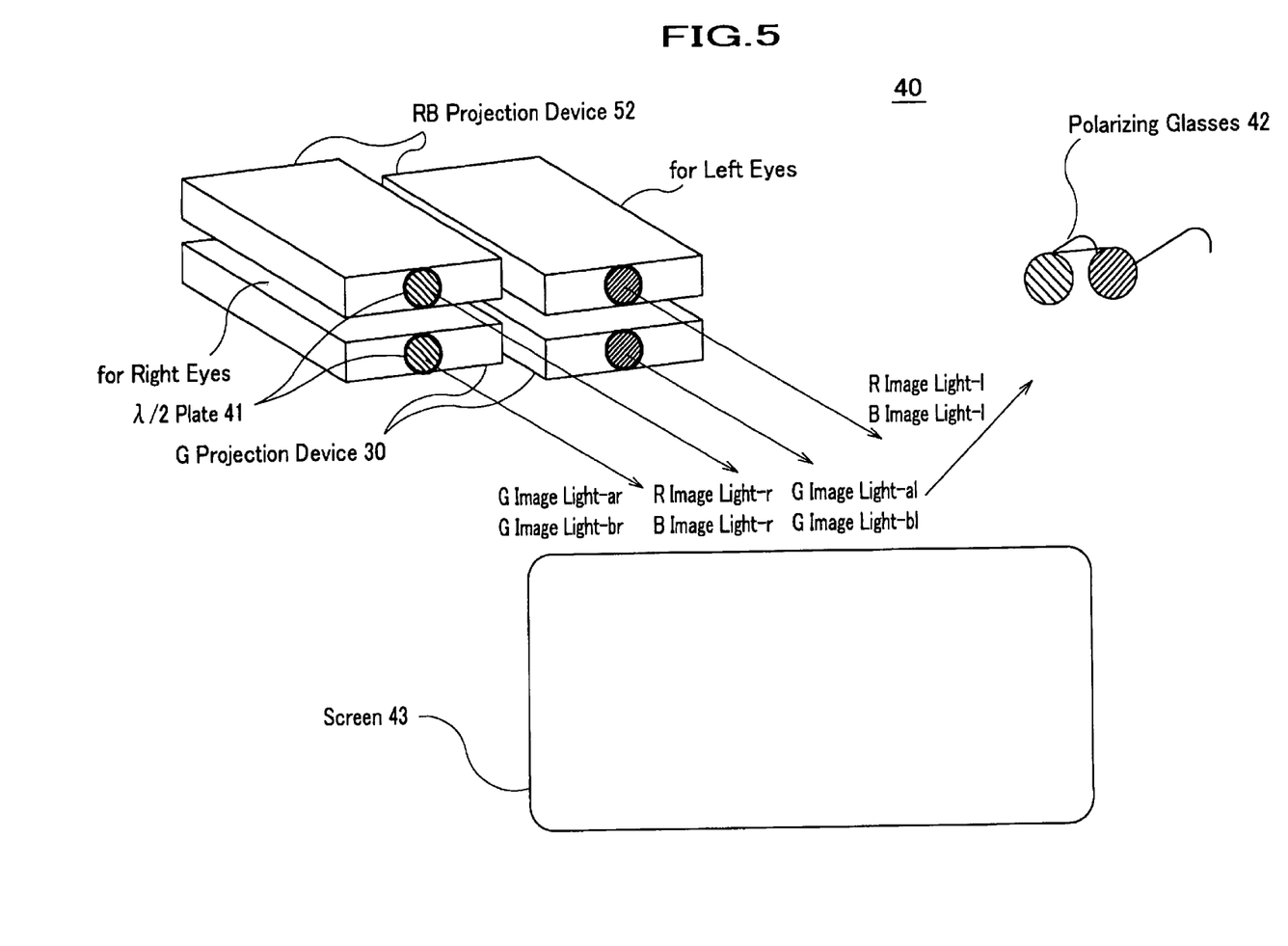
FIG. 5 is a schematic that shows a stereo image generation system according to the second embodiment of the present invention.

The second embodiment of the present invention is a stereo image generation system 40 as shown in FIG. 5, which is a schematic thereof. The stereo image display system comprises RB projection devices 52 for the right eyes and the left eyes, G projection devices for the right eyes and the left eyes, half wave length plates (for changing polarization) and a screen 43.

The RB projection device 52 projects R image light and B image light to the screen, wherein these two image lights are in the same polarization and composed in a single image light. The linearly polarization method used in the RB projection device 52 is same as the conventional technology as described in BACKGROUND OF INVENTION with FIG. 7. The half wave length plates 41 are for rotating a linearly polarized incidental light in 90 degree. The half wave length plate is used one of two RB projection devices and one of two G projection devices so that the use of the half wave length plates to these projection devices is for either those for the right eyes or the left eyes. The project devices project the image light onto the screen 43 which diffuses the projected image in a certain view angle covering observers. The observers wear polarizing glasses 42 which have polarization system such that the polarizer for the left eye has the same polarization as that of the polarization devices for G image light and RB image light for the left eyes as well as the polarization for the right eye does for the right eyes.

The G projection device is constructed with the optical process unit according to the first embodiment so that G image light is in a single polarization but has a normal image and pixel-shifted image in slightly different wave length range even in G image light being projected onto the screen 43.

If the polarization of the G projection device and the RB projection device for the right eyes has 90 degrees rotation in their polarizations against the polarization of those for left eyes, then no half wave length plates are necessary. Because an orthogonal polarization between the image lights for right eyes and the image lights for left eyes has been completed when the image light is projected from projection devices.

Figure 4:
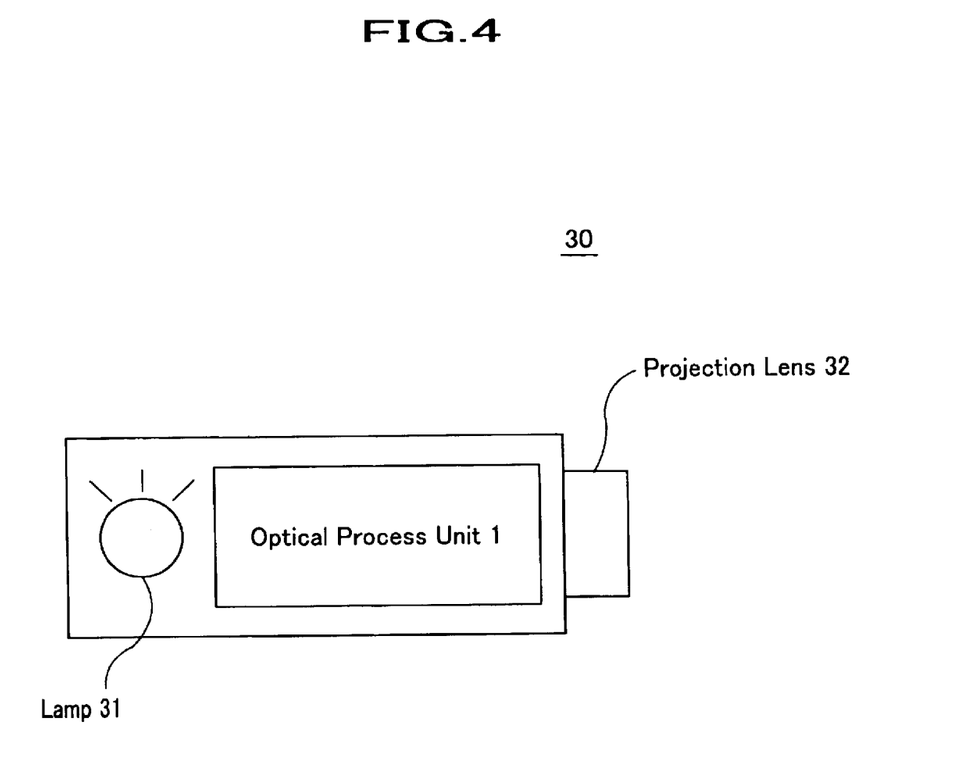
FIG. 4 is a schematic that shows the construction of the projection device.

The construction of the G projection device is explained using FIG. 4. The G projection device includes an optical process unit 1, a lamp 31 for a light source and a projection lens 32. The lamp 31 emits white light to the optical process unit 1. If necessary, a reflector can assist the light to mostly be oriented to the optical process unit 1. The projection lens are for projecting and converting the light, which are originally the incidental white light emitted from the lamp 31 and then processed by the optical process unit, on to the screen 43. The optical process unit is same as that explained as the first embodiment.

Another set of projection lenses are used for the RB projection device 52 that projects R image light and B image light converted in a single beam light to the screen after passing through the projection lens.

In these construction, G light-a and G light-b are generated from white light through the optical process unit 1. The G image light is composed with the G light-a and G light-b and projected onto the screen 43 through the projection lens 32. The optical process unit 1 superimposes the G image information at the reflection on reflective liquid crystals 7 and 8. The image information is transferred to G image light-a ($\lambda<\lambda 3$, S wave) and G image light-b ($\lambda>\lambda 3$, S wave) which are in the same polarization but slightly different wave length and finally projected onto the screen 43.

The stereo image display system 40 as has been explained above has two G project devices 30, one for right eyes that projects G image light-ar ($\lambda<\lambda 3$, S wave) and G image light-br ($\lambda>\lambda 3$, S wave) and two RB project devices 52, one for right eyes that projects R image light-r (S wave) and B image light-r (S wave). These four lights are projected to the screen 43 as P wave after passing through the half wave length plate and their polarization being rotated in 90 degrees. On the other hand, the stereo image display system 40 has the other G project device 30 for left eyes that projects G image light-al ($\lambda<\lambda 3$, S wave) and G image light-bl ($\lambda>\lambda 3$, S wave) and the other RB project device 52, for left eyes that projects R image light-l (S wave) and B image light-l (S wave). These four lights are projected to the screen 43 as S wave as they are. Then the lights for the right eyes and the left eyes are mutually orthogonal on the screen.

As explained above, it is possible to construct the same stereo image display system without two pieces of a half wave length plate. For example, a G project device for the right eyes projects both G image light-ar ($\lambda<\lambda 3$; P wave) and pixel-shifted G image light-br ($\lambda>\lambda 3$; P wave) and an RB projection device for right eyes projects both R image light-r (P wave) and B image light-r (P wave). The other G projection device for the left eyes projects both G image light-al ($\lambda<\lambda 3$; S wave) and pixel-shifted G image light-bl ($\lambda>\lambda 3$; S wave) and the other RB projection device for left eyes projects both R image light-l (S wave) and B image light-l (S wave). By projecting all these lights, it is possible to generate high fidelity stereo image display realizing a pixel-shifted G image generation and stereoscopic image display.

As discussed above, the present invention provides the optical process unit and the application of the image display system using the optical process unit. Moreover the present invention can provides the optical process method that is used for the optical process unit. The invention has the advantages as explained below.

The inventions described in Claim 1 to Claim 5 can compose a single image light from two different wave length lights having the same polarization, wherein the single image light is superimposed of the image information. The present invention can solve the problem such that the normal image light and the pixel-shifted image light have different polarization as S wave and P wave for each other and the stereo image processing using difference of the polarization can not keep the compatibility with the pixel-shifted image processing. The solution is provided by the optical process unit regarding the present invention that allows to generate an image light in a single linear polarization, wherein the image light has a normal image and the pixel-shifted image. The present invention can provide an optical process unit by which the pixel-shifted image generation and the stereo image display can be compatible to realize a high fidelity stereo image display system.

What is claimed is:

1. An optical process unit comprising:
   a filtering means that discriminates a colored light which has a predetermined wavelength range from a white light and filtrates said colored light off said white light,
   a polarizing means that selects a certain polarized light component from said colored light so that light component of said colored light is compliant to a linearly polarizing direction of said polarizing means and passes said linearly polarized light therethrough,
   a resolution means that resolves said colored light passing through said polarizing means at a predetermined wave length into a first light beam and a second light beam, a first orientating means that changes direction of said first light beam to a first reflective display device and passes a reflected light of said first light beam at said first reflective display device, a first image information superimposing means that superimposes an image information onto said first reflected light of said first light beam at said first reflective display device, which rotates polarization of said first light beam by 90 degrees from said first light beam, so that a first image light beam is generated by reflection thereat, a second orientating means that changes direction of said second light beam to a second reflective display device and passes a reflected light of said second light beam at said second reflective display device, a second image information superimposing means that superimposes an image information onto said second reflected light of said second light beam at said second reflective display device, which rotates polarization of said second light beam by 90 degrees from said second light beam, so that a second image light beam is generated by reflection thereat, an image light composing means that composes said first image light and said second image light into a single image light, and said first orientating means, said second orientating means, said first reflective display device, said second reflective display device and said image light composing means are arranged in an alignment such that said first image light and said second image light are collimated to be composed into said single image light.

2. A first reflective display and a second reflective display device according to claim 1, wherein;

said first reflective display and said second reflective display device are constructed with reflective liquid crystal display devices.

3. An optical processing unit according to claim 1, wherein;

said predetermined wavelength range is included in a wave length of green light defined in a display primary.

4. A stereo image generation system comprising:

a first pair of projection devices which have optical processing units according to claim 3 and projection lenses, wherein polarizations of a pair projected lights thereby are orthogonal each other, a second pair of projection devices which project linearly polarized image lights composed in two single image lights, of which wave lengths are those of red-color light and blue-color light, respectively, wherein polarizations of one of said two single image lights and the other of said two single image lights are orthogonal each other a screen on which said pair of projected lights from said first pair of projection devices and said pair of two single image lights projected from said second pair of projection devices are projected and reflected.

5. A stereo image generation system according to claim 4 wherein;

polarizations of a pair of projected lights projected by said first pair of projection devices, polarizations of a pair of projected lights projected by said second pair of projection devices and polarizations of a pair of projected lights projected by said third pair of projection devices are all in same direction, and two half wave length plates, one used for one of a pair of said first pair of projection devices and the other for one of the said second pair of projection devices, are further included by which polarization direction of one of a pair projected lights from said first pair of projection devices, polarization direction of one of said two single image lights are rotated in 90 degrees.

6. An optical processing method comprising:

a filtering step that discriminates a colored light which has a predetermined wavelength range from a white light and filtrates said colored light off said white light, a polarizing step that selects a certain polarized light component from said colored light so that light component of said colored light is compliant to a linearly polarizing direction of said polarizing means and selects said linearly polarized light, a resolution step that resolves said colored light selected in said polarizing step at a predetermined wave length into a first light beam and a second light beam, a first orientating step that changes direction of said first light beam to a first reflective display device and passes a reflected light of said first light beam at said first reflective display device, a first image information superimposing step that superimposes an image information onto said first reflected light of said first light beam at said first reflective display device, which rotates polarization of said first light beam by 90 degrees from said first light beam, so that a first image light beam is generated by reflection thereof, a second orientating step that changes direction of said second light beam to a second reflective display device and passes a reflected light of said second light beam at said second reflective display device, a second image information superimposing step that superimposes an image information onto said second reflected light of said second light beam at said second reflective display device, which rotates polarization of said second light beam by 90 degrees from said second light beam, so that a second image light beam is generated by reflection thereof, and an image light composing step that composes said first image light and said second image lights into such a single image light, that said first image light and said second image light are collimated to be composed into said single image light.

* * * * *